(12) United States Patent
Whynot et al.

(10) Patent No.: US 8,348,110 B1
(45) Date of Patent: Jan. 8, 2013

(54) SELF-ROTATING CUP HOLDER

(76) Inventors: William O. Whynot, Welland (CA);
Enno Ferrara, Port Colborne (CA)

( * ) Notice: Subject to any disclaimer, the term of this patent is extended or adjusted under 35 U.S.C. 154(b) by 491 days.

(21) Appl. No.: 12/695,016

(22) Filed: Jan. 27, 2010

(51) Int. Cl.
*B60N 3/10* (2006.01)

(52) U.S. Cl. ............... 224/282; 224/926; 248/311.2; 248/425; 384/611

(58) Field of Classification Search .............. 224/282, 224/544, 548, 553, 926; 248/311.2, 425; 220/737; 297/188.14; 384/495, 609, 611, 384/612
See application file for complete search history.

(56) References Cited

U.S. PATENT DOCUMENTS

| | | |
|---|---|---|
| 3,637,185 A * | 1/1972 | Mikos et al. ............... 248/425 |
| 4,721,276 A | 1/1988 | Moss |
| 4,819,843 A | 4/1989 | Nakayama |
| 4,887,784 A | 12/1989 | Kayali |
| 5,533,857 A * | 7/1996 | Ferrone ............... 414/757 |
| D373,935 S | 9/1996 | Cole et al. |
| 5,664,718 A | 9/1997 | Vine |
| 2006/0022106 A1 | 2/2006 | Mackin |

* cited by examiner

*Primary Examiner* — Justin Larson

(57) ABSTRACT

A self-rotating cup holder comprising cup-shaped inner and outer bases, a weight disposed in the top edge of the inner base, the inner base can rotate within the outer base; two circular tunnels formed by circular tracks disposed in the top edges of the inner and outer bases; a spring mounting block disposed in each tunnel, springs extend from the mounting blocks through the respective tunnels in opposite directions; a stopper tunnel disposed in each tunnel and positioned opposite the mounting blocks, spring stoppers on the ends of the springs are positioned outside the respective stopper tunnels, wherein when the inner base rotates in a first direction a first spring is stretched in a first direction toward a first spring mounting block, wherein when the inner base rotates in a second direction a second spring is stretched in second direction toward a second spring mounting block.

14 Claims, 9 Drawing Sheets

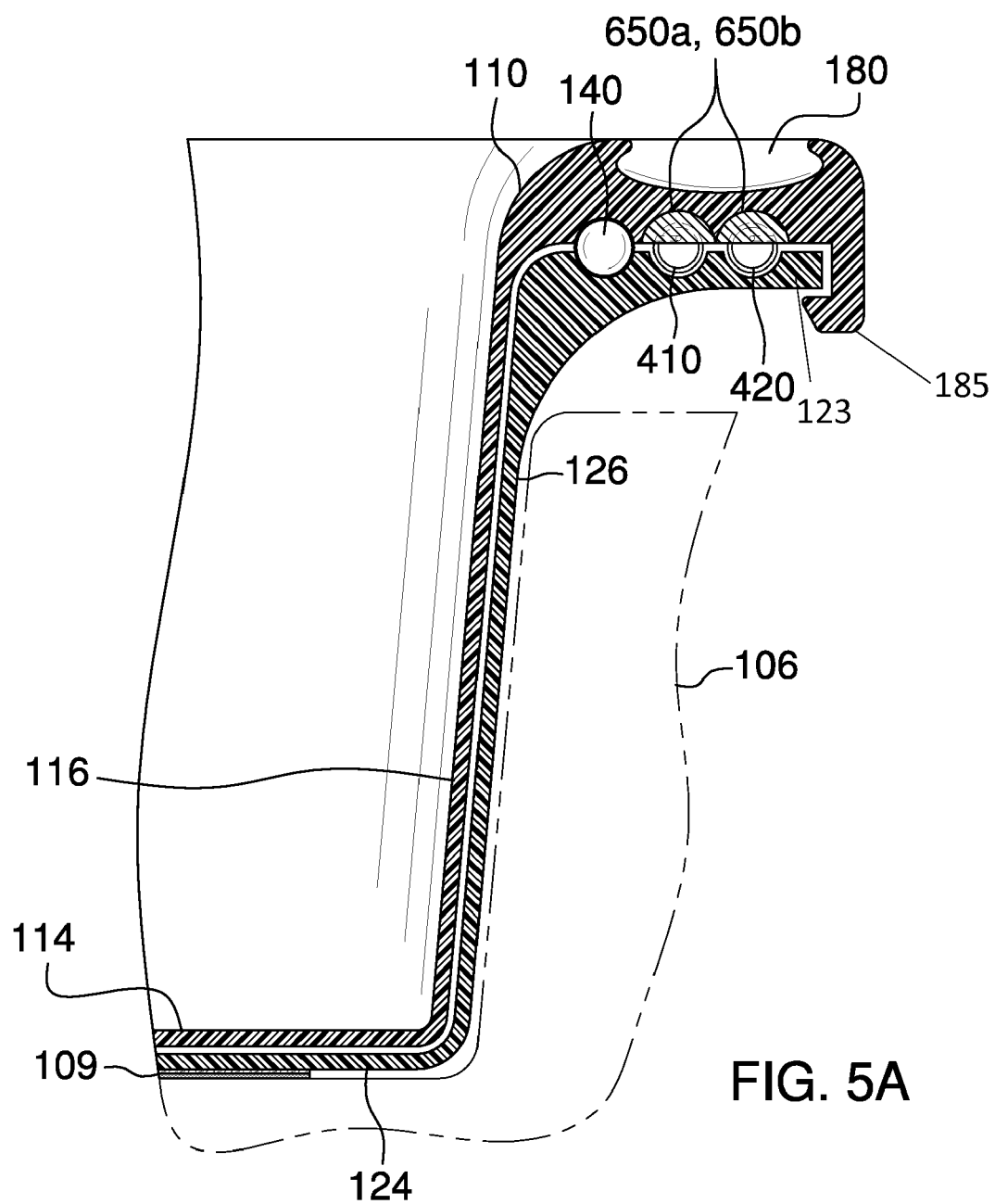

SELF-ROTATING CUP HOLDER

FIELD OF THE INVENTION

The present invention is directed to cup holder device for an automobile, more particularly to a cup holder device for an automobile for preventing the spilling of the contents of the cup as the automobile turns, accelerates, and/or brakes.

BACKGROUND OF THE INVENTION

Drivers often carry beverages with them while driving and use the standard cup holders in the car. Unexpected and quick stops or turns can cause the beverage to spill out of the cup or cause the cup to fall out of the cup holder. The present invention features a self-rotating cup holder for preventing the spilling of the cup contents in those situations.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 5A and FIG. 5B are side cross-sectional views of the self-rotating cup holder of FIG. 1.

DESCRIPTION OF PREFERRED EMBODIMENTS

Figure 1:
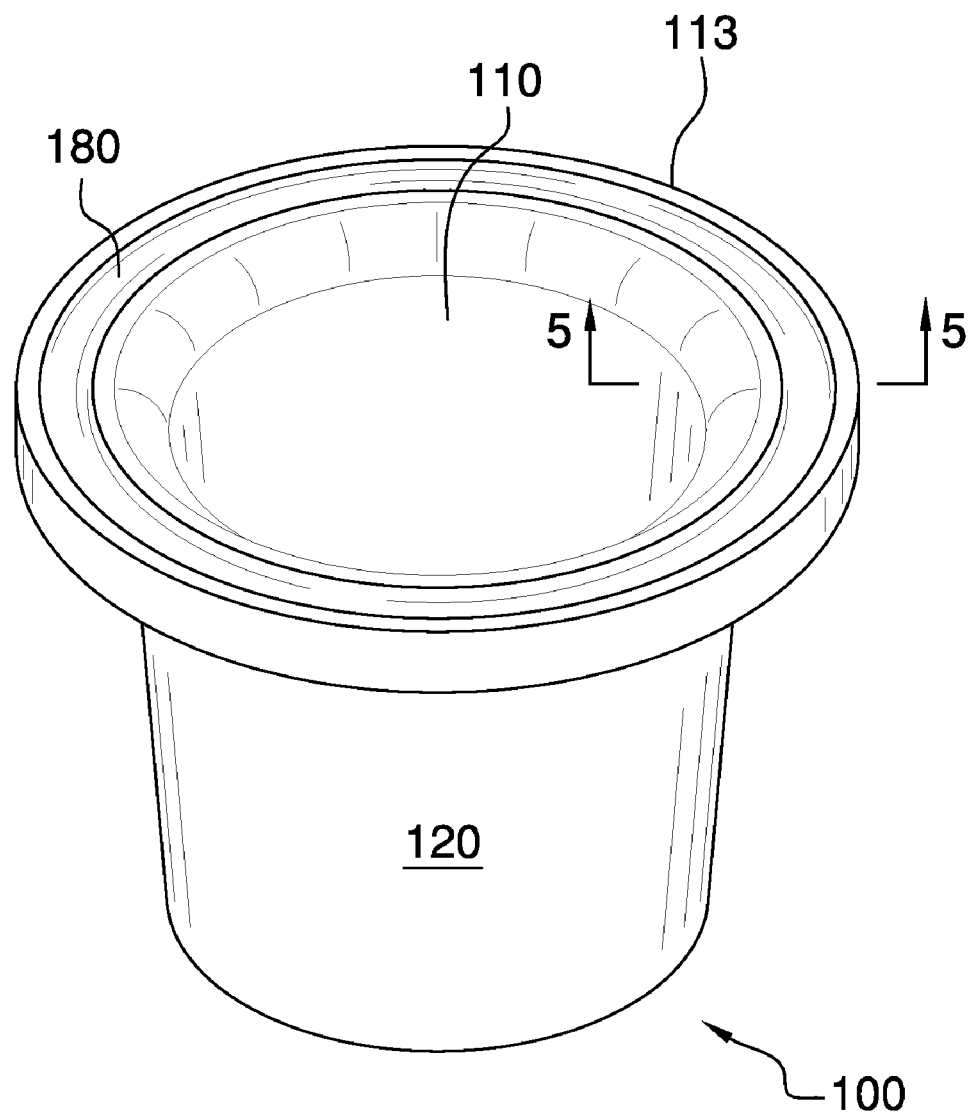
FIG. 1 is a perspective view of the self-rotating cup holder of the present invention.
Figure 2:
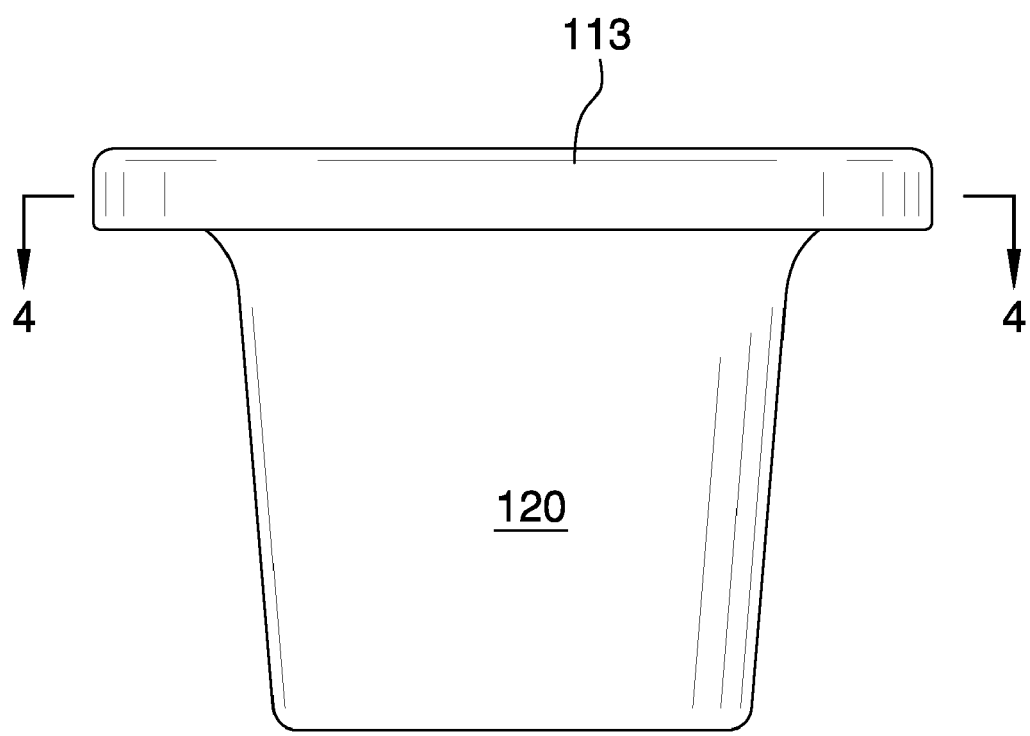
FIG. 2 is a front view of the self-rotating cup holder of FIG. 1.
Figure 3:
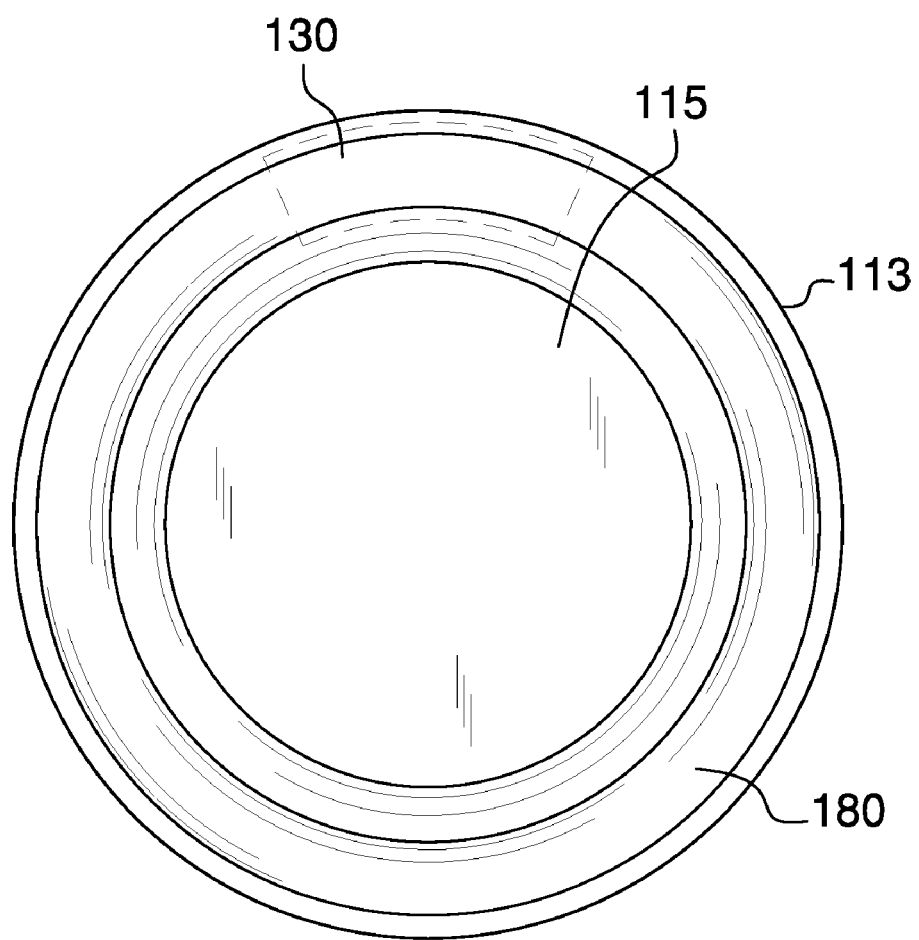
FIG. 3 is a top view of the self-rotating cup holder of FIG. 1.

Referring now to FIGS. 1-7, the present invention features a self-rotating cup holder 100 for preventing the contents of a cup from spilling while in a vehicle. The self-rotating cup holder 100 of the present invention is for fastening into an existing cup holder component 106 of a vehicle 105. The self-rotating cup holder 100 of the present invention may be fastened via a fastening mechanism such as a hook-and-loop fastener 109. The self-rotating cup holder 100 is designed to rotate upon turning, braking, or acceleration of the vehicle 105.

The self-rotating cup holder 100 comprises a generally cylindrical inner base 110 having a generally cylindrical side wall 116, a top edge 113, a bottom surface 114, and an inner cavity 115. The inner base 110 may have a shape similar to a standard cup, well known to one of ordinary skill in the art. In some embodiments, the top edge 113 of the inner base 110 extends outwardly from the side wall 116 (e.g., away from the inner cavity 115, generally perpendicularly to the side wall 116).

The self-rotating cup holder 100 further comprises a generally cylindrical outer base 120 that wraps around the inner base 110. The outer base 120 has a shape similar to the inner base 110, for example the outer base 120 has a generally cylindrical side wall 126, a top edge 123, a bottom surface 124, and an inner cavity. The inner base 110 slidably fits into the inner cavity of the outer base 120. The top edge 113 of the inner base 110 generally rests atop the top edge 123 of the outer base 120. The inner base 110 can rotate (e.g., spin in a first direction and second direction) within the outer base 120.

The top edge 113 of the inner base 110 has a top surface and a bottom surface, and the top edge 123 of the outer base 120 has a top surface and a bottom surface. Generally, the bases are positioned such that the bottom surface of the top edge 113 of the inner base 110 faces the top surface of the top edge 123 of the outer base 120.

In some embodiments, an extension 185 is disposed on the top edge 113 of the inner base 110 that is for engaging (e.g., snapping on to) the top edge 123 of the outer base 120. In some embodiments, the extension 185 may latch around the top edge 123 of the outer base 120 (e.g., contacting the bottom surface of the top edge 123 of the outer base 120, hugging the top edge 123 of the outer base 120). The extension 185 may help keep the inner base 110 secured to the outer base 120 while allowing the inner base 110 to be removed from the outer base 120 if needed (e.g., for cleaning, maintenance, etc.).

A cup can be inserted into the inner base 110 (e.g., the inner cavity 115 of the inner base 110). In some embodiments, a drip well 180 is disposed in the inner base 110, for example in the top surface of the top edge 113 of the inner base 110. The drip well 180 is an indentation in the top surface of the top edge 113 of the inner base 110 that functions to sequester any liquid that may spill from a cup that has been inserted into the inner base 110. The drip well 180 can help prevent the liquid from getting on the vehicle 105 or on the user.

Disposed in a portion of the top edge 113 of the inner base 110 is a weight 130. In some embodiments, the weight 130 occupies about 25% of the circumference of the top edge 113 of the inner base 110. For example, if the top edge 113 is about $6\pi$ inches in circumference (e.g., about 18.84 inches), the weight 130 occupies about $1.5\pi$ (about 4.7 inches) of the circumference of the top edge 113. In some embodiments, the weight 130 occupies between about 15 to 25% of the circumference of the top edge 113 of the inner base 110. For example, if the top edge 113 is about $6\pi$ inches in circumference, the weight 130 occupies between about $0.9\pi$ to $1.5\pi$ inches of the circumference of the top edge 113. In some embodiments, the weight 130 occupies between about 5 to 15% of the circumference of the top edge 113 of the inner base 110. For example, if the top edge 113 is about $6\pi$ inches in circumference, the weight 130 occupies between about $0.3\pi$ to $0.9\pi$ inches of the circumference of the top edge 113. In some embodiments, the weight 130 occupies less than about 5% of the circumference of the top edge 113 of the inner base 110. For example, if the top edge 113 is about $6\pi$ inches in circumference, the weight 130 occupies less than about $0.3\pi$ inches of the circumference of the top edge 113.

As used herein, the term "about" refers to plus or minus 10% of the referenced number. For example, an embodiment wherein the top edge 113 of the inner base 110 is about 18 inches in circumference includes a top edge 113 between 16.2 and 19.8 inches in circumference.

A cup may be placed into the inner base 110 so that the mouth hole of the cup lines up opposite the weight 130. In some embodiments, the cup holder 100 of the present invention is labeled with a marker (e.g., an arrow) to indicate where a user should align the mouth hole of the cup (e.g., the marker is positioned opposite the weight 130).

Disposed in the bottom surface of the top edge 113 of the inner base 110 is a first circular track. In some embodiments, a second circular track and a third circular track are disposed in the bottom surface of the top edge 113 of the inner base 110. The circular tracks are concentric circles. Disposed in the top surface of the top edge 123 of the outer base 120 is a fourth circular track. In some embodiments, a fifth circular track and a sixth circular track are disposed in the top surface of the top edge 123 of the outer base 120. The circular tracks are concentric circles.

The first track is aligned with the fourth track (when the inner base 110 is fitted into the outer base 120), forming a first circular tunnel 610 in between the top edges of the bases. The second track is aligned with the fifth track (when the inner base 110 is fitted into the outer base 120), forming a second circular tunnel 620 between the top edges of the bases. The third track is aligned with the sixth track (when the inner base 110 is fitted into the outer base 120), forming a third circular tunnel 630 between the top edges of the bases. In some embodiments, the first track is closest to the side wall 126 of the outer base 120 and the third track is farthest from the side wall 126 of the outer base 120.

Disposed in the first tunnel 610 is a plurality of ball bearings 140. The ball bearings 140 allow the inner base 110 to rotate in a first direction or second direction (e.g., clockwise, counterclockwise) with respect to the outer base 120. The outer base 120 is generally fixedly attached in the cup holder component 106 of the vehicle 105 (e.g., via an attachment means such as a hook-and-loop holder), thus the outer base 120 remains stationary when the inner base 110 rotates. Ball bearing assemblies are well known to one of ordinary skill in the art.

In some embodiments, a first spring mounting block 650a is disposed (e.g., fixedly attached) in the second tunnel 620. The first spring mounting block 650a may be attached to the second track, which is the half of the second tunnel 620 in the inner base 110. The first spring mounting block 650a has a first end and a second end. A first spring 410 is attached to the first spring mounting block 650a, for example the first end of the first spring 410 is attached to the first end of the first spring mounting block 650a and the second end of the first spring 410 extends through the second tunnel 620. A first spring stopper 440 is disposed on the second end of the first spring 420.

In some embodiments, a second spring mounting block 650b is disposed (e.g., fixedly attached) in the third tunnel 630. The second spring mounting block 650b may be attached to the third track, which is the half of the third tunnel 630 in the inner base 110. The second spring mounting block 650b has a first end and a second end. A second spring 420 is attached to the second spring mounting block 650b, for example the first end of the second spring 420 is attached to the second end of the second spring mounting block 650b and the second end of the second spring 420 extends through the third tunnel 630. A second spring stopper 450 is disposed on the second end of the second spring 420.

Figure 4A:
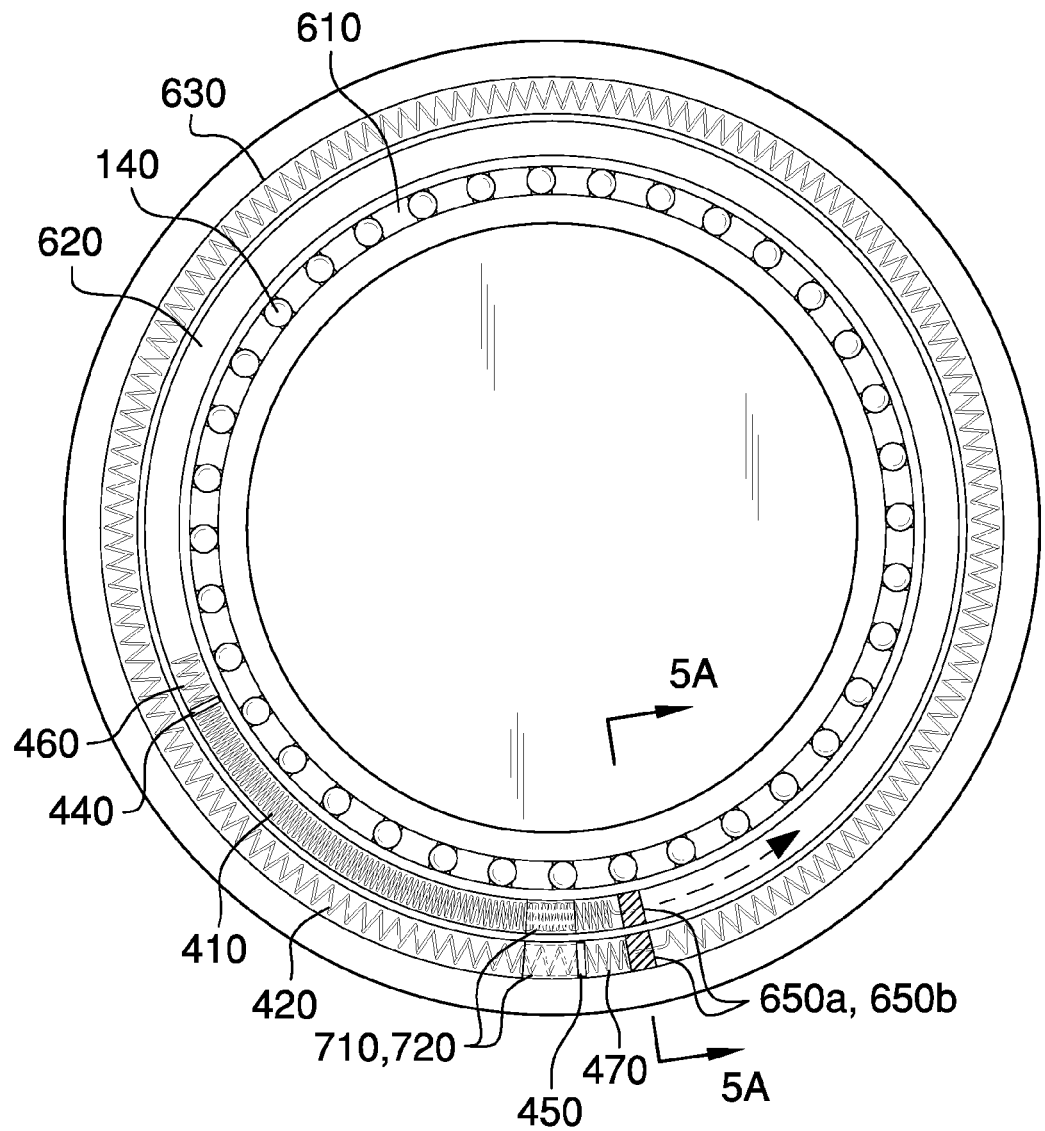
FIG. 4A and FIG. 4B are top cross-sectional views of the self-rotating cup holder of FIG. 1.
Figure 4B:
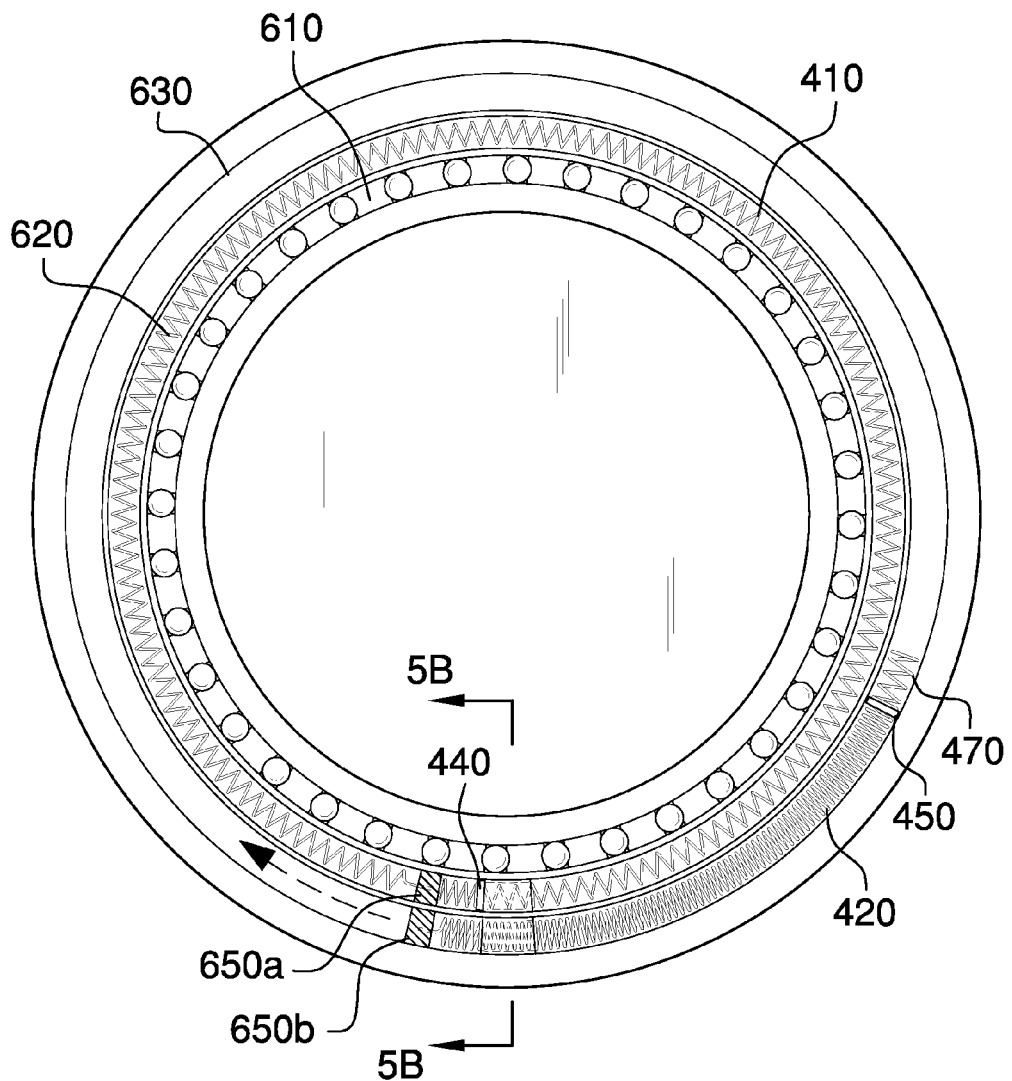
Figure 5B:
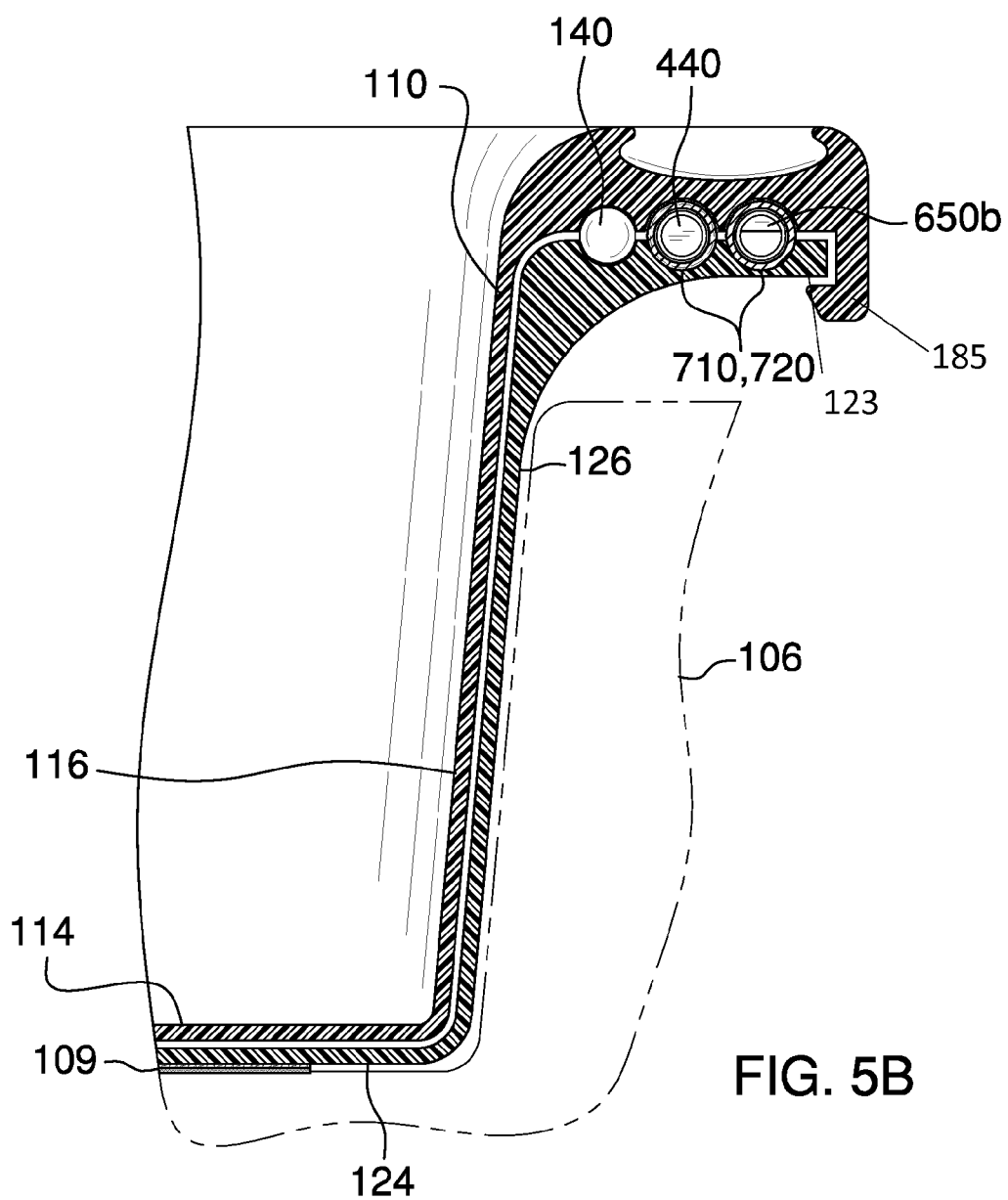
Figure 6:
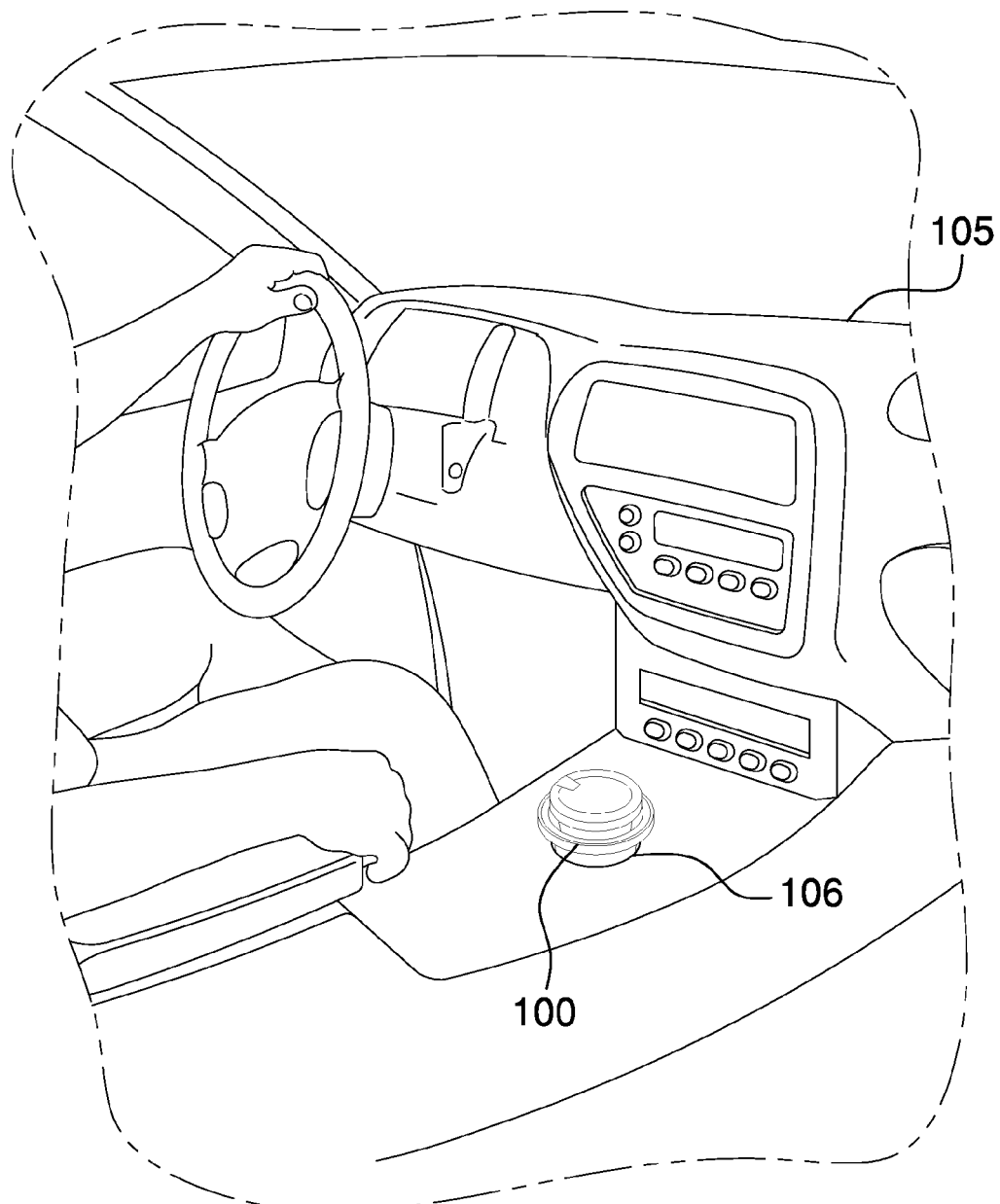
FIG. 6 is a perspective view of the self-rotating cup holder of the present invention as used in a car.

The first mounting block 650a is generally aligned with the second mounting block 650b (see FIG. 4A, FIG. 4B). The first spring 410 is attached to the first end of the first spring mounting block 650a and the second spring 420 is attached to the second end of the second spring mounting block 650b, thus the springs extend through the respective tunnels in opposite directions (e.g., clockwise, counter clockwise).

In some embodiments, the mounting blocks 650 are positioned about 90 degrees from the weight 130. The mounting blocks 650 are not limited to this position with respect to the weight 130. The "starting position" may refer to the configuration wherein the mounting blocks 5=650 are positioned about 90 degrees from the weight 130. The mouth of the cup to be used with the device 100 is generally placed opposite the weight 130 (e.g., 180 degrees away).

Disposed in the fifth track (in the outer base 120 portion of the second tunnel 620) is a first stopper tunnel 710. Disposed in the sixth track (in the outer base 120 portion of the third tunnel 630) is a second stopper tunnel 720. The first stopper tunnel 710 and the second stopper tunnel 720 each have a first end 711, 721 and a second end 712, 722. The first stopper tunnel 710 and the second stopper tunnel 720 are aligned (see FIG. 4A, FIG. 4B).

The first stopper tunnel 710 has an inner channel. The first stopper tunnel 710 is positioned around the first spring 410 (with the first spring 410 in the inner channel) such that the second end of the first spring 410 (with the first spring stopper 440) is outside the first end 711 of the first stopper tunnel 710. The first spring stopper 440 is larger than the inner channel of the first stopper tunnel 710 so that the first spring stopper 440 always remains on the side of the first stopper tunnel 710 facing the first end 711 (see FIG. 7).

The second stopper tunnel 720 has an inner channel. The second stopper tunnel 720 is positioned around the second spring 420 (with the second spring 420 in the inner channel) such that the second end of the second spring 420 (with the second spring stopper 450) is outside the second end 722 of the second stopper tunnel 720. The second spring stopper 450 is larger than the inner channel of the second stopper tunnel 720 so that the second spring stopper 450 always remains on the side of the second stopper tunnel 720 facing the second end 722 (see FIG. 7).

The first spring 410, second spring 420, first spring stopper 440, second spring stopper 450, first stopper tunnel 710, and second stopper tunnel 720 provide a mechanism for moving the inner base 110 back to a "starting" position (e.g., after the inner base 110 has moved due to movement of the vehicle 105).

The first spring 410 can be stretched in a first direction such that the second end of the first spring 410 (and the first spring stopper 440) are positioned near the second end of the first spring mounting block 650a (see FIG. 4B). The second spring 420 can be stretched in a second direction such that the second end of the second spring 420 (and the second spring stopper 450) are positioned near the first end of the second spring mounting block 650b (see FIG. 4A). In some embodiments, a first buffer spring 460 is disposed on the first spring stopper 440 (opposite the first spring 410) for preventing the first spring stopper 440 from abruptly contacting the second end of the first spring mounting block 650a. In some embodiments, a second buffer spring 470 is disposed on the second spring stopper 450 (opposite the second spring 420) for preventing the second spring stopper 450 from abruptly contacting the first end of the second spring mounting block 650b.

When the inner base rotates in a first direction (the weight 130 causes the rotation), the first spring 410 is stretched in a first direction. The second end of the first spring 410 (with the first spring stopper 440) are moved near the second end of the first spring mounting block 650a (see FIG. 4B) because the first stopper tunnel 710 pushes on the first spring stopper 440. The second spring 420 however, is in a relaxed state because the second stopper tunnel 720 slides along the second spring 420 (toward the second end of the second spring mounting block 650b, away from the second spring stopper 450).

When the inner base 110 rotates in a second direction (the weight 130 causes the rotation), the second spring 420 is stretched in second direction. The second end of the second spring 420 (with the second spring stopper 450) are moved near the first end of the second spring mounting block 650b (see FIG. 4A) because the second stopper tunnel 720 pushes on the second spring stopper 450. The first spring, however, is in a relaxed state because the first stopper tunnel 710 slides along the first spring 401 (toward the first end of the first spring mounting block 650a, away from the first spring stopper 440).

Figure 7:
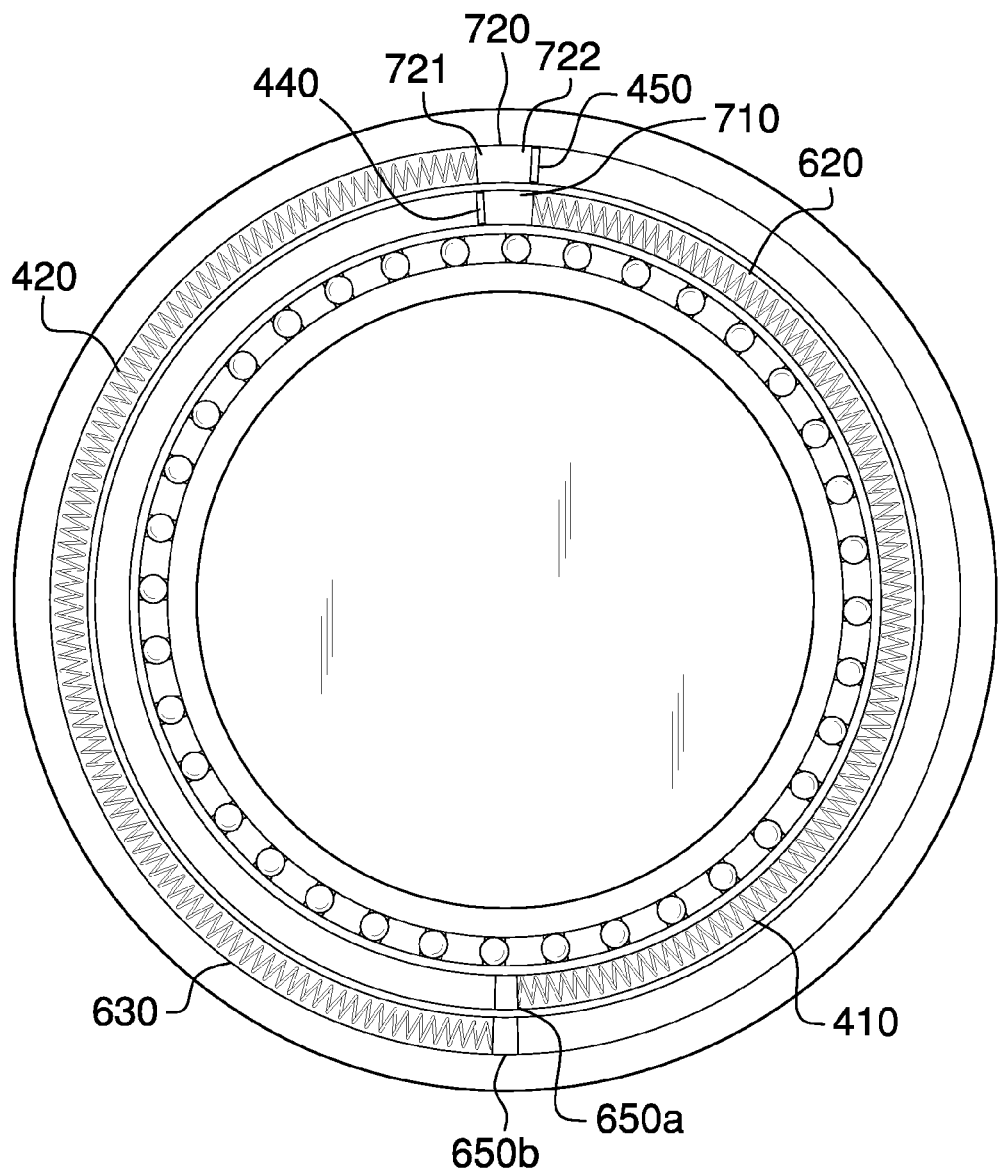
FIG. 7 is a top cross-sectional view of the self-rotating cup holder of FIG. 1.

The tension in the springs biases them in the starting position (see FIG. 7). When the springs are stretched, they will have a tendency to return to the starting position.

To use the self-rotating cup holder 100 of the present invention, a user can install the cup holder 100 into his/her cup holder component 106 in his/her vehicle 105. The user can then insert his beverage cup into the inner cavity 115 of the inner base 110. He/she orients the mouth opening of the beverage cup opposite the weight 130 (this may be indicated with a marker or arrow). As an example, if the user accelerates the vehicle 105 forwardly, the weight 130 in the top edge 113 of the inner base 110 will have a tendency to be forced toward the rear of the vehicle 105. This causes the inner base 110 to rotate about the ball bearings 140 in the first track 610 until the weight 130 is oriented toward the rear of the vehicle 105. The liquid inside the beverage cup is also forced in the direction of the rear of the vehicle 105 as the vehicle 105 accelerates forwardly. However, the weight 130 causes the inner base 110 to rotate such that the mouth opening of the beverage cup is oriented toward the front of the vehicle 105. Thus, the liquid in the beverage cup will not spill from the mouth opening of the cup. When the user is finished with his/her beverage, he/she can remove it from the inner base 110 and replace it with a new beverage.

The self-rotating cup holder 100 of the present invention may be constructed in a variety of sizes. For example, in some embodiments, the self-rotating cup holder 100 constructed in shapes and sizes to fit into standard cup holder components 106 integrated into vehicles 105.

In some embodiments, the spring mounting blocks are attached to the outer base 120 and the stopper tunnels are attached to the inner base 110.

The disclosures of the following U.S. Patents are incorporated in their entirety by reference herein: U.S. Pat. No. 4,721,276; U.S. Pat. No. 4,887,784; U.S. Pat. No. 4,819,843; U.S. Pat. No. 5,664,718; U.S. Pat. Application No. 2006/0022106 A1.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A self-rotating cup holder comprising:
   (a) a generally cup-shaped inner base having a top edge and an inner cavity, a weight is disposed in a portion of the top edge, the inner cavity is for receiving a beverage cup;
   (b) a generally cup-shaped outer base for inserting into a cup holder in a vehicle, the outer base having a top edge and an inner cavity, wherein the inner cavity of the inner base slidably fits into the inner cavity of the outer base such that the inner base can rotate within the outer base and the top edge of the inner base slidably rests over the top edge of the outer base;
   (c) a second circular tunnel formed by a second circular track disposed in a bottom surface of the top edge of the inner base and a fifth circular track disposed in a top surface of the top edge of the outer base;
   (d) a third circular tunnel formed by a third circular track disposed in the bottom surface of the top edge of the inner base and a sixth circular track disposed in the top surface of the top edge of the outer base;
   (e) a first spring mounting block disposed in the second circular tunnel, wherein a first end of a first spring is attached to a first end of the first spring mounting block and a first spring stopper is disposed on a second end of the first spring;
   (f) a second spring mounting block disposed in the third circular tunnel and aligned with the first spring mounting block, wherein a first end of a second spring is attached to a second end of the second spring mounting block and a second spring stopper is disposed on the second end of the second spring, wherein the first spring and the second spring extend through the respective tunnels in opposite directions;
   (g) a first stopper tunnel disposed in the second tunnel and positioned around the first spring, the first spring stopper on the first spring is positioned outside of a first end of the first stopper tunnel; and
   (h) a second stopper tunnel disposed in the third tunnel and aligned with the first stopper tunnel, the second stopper tunnel is positioned around the second spring, the second spring stopper on the second spring is positioned outside of a second end of the second stopper tunnel, wherein the first stopper tunnel and second stopper tunnel are both positioned opposite both the first spring mounting block and the second spring mounting block;

wherein when the inner base rotates in a first direction the first spring is stretched in a first direction toward a second end of the first spring mounting block, wherein when the inner base rotates in a second direction the second spring is stretched in second direction toward a first end of the second spring mounting block;

wherein either (i) the first spring mounting block and the second spring mounting block are fixedly attached to the second track and the third track, respectively, and the first stopper tunnel and the second stopper tunnel are fixedly attached to the fifth track and the sixth track, respectively, or (ii) the first spring mounting block and the second spring mounting block are fixedly attached to the fifth track and the sixth track, respectively, and the first stopper tunnel and the second stopper tunnel are fixedly attached to the second track and the third track, respectively.

2. The self-rotating cup holder of claim 1, wherein the outer base is fastened in the cup holder in the vehicle via a fastening mechanism.

3. The self-rotating cup holder of claim 2, wherein the fastening mechanism is a hook-and-loop fastener.

4. The self-rotating cup holder of claim 1 further comprising an extension disposed on the top edge of the inner base that is for engaging the top edge of the outer base, the extension functions to help keep the inner base removably secured to the outer base.

5. The self-rotating cup holder of claim 1 further comprising a drip well disposed in a top surface of the top edge of the inner base, the drip well functions to sequester liquid that may spill from a cup that has been inserted into the inner base.

6. The self-rotating cup holder of claim 1, wherein the cup is positioned in the inner base such that a mouth hole of the cup is opposite the weight.

7. The self-rotating cup holder of claim 1 further comprising a marker for suggesting where a user should align a mouth hole of the cup when placing the cup in the inner base.

8. The self-rotating cup holder of claim 1 further comprising a first circular tunnel disposed in between the top edge of the inner base and the top edge of the outer base.

9. The self-rotating cup holder of claim 8, wherein the first circular tunnel is formed by a first track disposed in the bottom surface of the top edge of the inner base and a fourth track disposed in the top surface of the top edge of the outer base.

10. The self-rotating cup holder of claim 8, wherein a plurality of ball bearings are disposed in the first circular tunnel, the ball bearings allow the inner base to rotate in a first direction or second direction with respect to the outer base.

11. The self-rotating cup holder of claim 1, wherein the first mounting block and second mounting block are positioned at a starting position, the starting position being about 90 degrees from the weight.

12. The self-rotating cup holder of claim 11, wherein tension in the first spring and the second spring biases the first mounting block and second mounting block in the starting position.

13. The self-rotating cup holder of claim 1 further comprising a first buffer spring disposed on the first spring stopper opposite the first spring for preventing the first spring stopper from abruptly contacting the second end of the first spring mounting block.

14. The self-rotating cup holder of claim 1 further comprising a second buffer spring disposed on the second spring stopper opposite the second spring for preventing the second spring stopper from abruptly contacting the first end of the second spring mounting block.

\* \* \* \* \*